United States Patent [19]
Fleischmann et al.

[11] 3,791,497
[45] Feb. 12, 1974

[54] ELASTIC SHAFT CLUTCH

[75] Inventors: Erwin Fleischmann; Karlheinz Watzlawek, both of Witten, Germany

[73] Assignee: Lohmann & Stolterfoht Aktiengesellschaft, Witten, Germany

[22] Filed: July 28, 1972

[21] Appl. No.: 275,917

[52] U.S. Cl............... 192/30 V, 192/70, 64/1 V, 64/27 NM, 74/574, 188/1 B, 310/51
[51] Int. Cl....... H02k 5/24, F16d 13/26, F16d 3/68
[58] Field of Search .... 192/30 V, 70; 64/1 V, 27 R, 64/27 NM; 188/1 B; 74/574; 310/51

[56] References Cited
UNITED STATES PATENTS 3,557,573  1/1971  Hansgen ...................... 192/70 X
2,320,721  6/1943  Ericsom ......................... 310/51 UX
2,520,582  8/1950  Tustin ............................. 310/51 X FOREIGN PATENTS OR APPLICATIONS
1,242,059  11/1964  Germany............................ 188/1 B

*Primary Examiner*—Allan D. Herrmann
*Attorney, Agent, or Firm*—Smyth, Roston & Pavitt

[57] ABSTRACT

Elastic clutches and couplings are disclosed in which the elastic components are bridged by a concentric coil-armature arrangement for attenuating oscillations between these parts which should rotate in unison.

5 Claims, 2 Drawing Figures

ELASTIC SHAFT CLUTCH

BACKGROUND OF THE INVENTION

The present invention relates to an elastic shaft clutch or coupling having concentrically disposed driving input and driven output members wherein the normally driven output member (secondary part) has rigid outer and inner ring members which are interconnected by elastic means. Within the context of this invention, no distinction needs to be made between primary part and that member of the secondary part which is directly connectible or connected to the primary part, because, for purposes of the invention, these parts rotate in unison without relative motion between them.

The employment of highly elastic couplings or clutches is quite advantageous in diesel engines in order to reduce the frequency of low frequency oscillations in the engine. As a consequence, the entire system can be operated supercritically. Actually, all kinds of diesel engine systems have been operated successfully in this manner, because the inherent damping characteristics of rubber suffices, and the highly elastic clutch or coupling needs to participate only insignificantly in the damping of the system.

Diesel engine engineering has led to the reduction in the weight-power ratio, so that energizing forces have increased under less favorable operating conditions for the participating masses. Thus, oscillations set up by higher frequencies in the crankshaft are now so large that the usual engine damping means are insufficient, and a significant portion of the system's oscillations must be reacted into the elastic clutch. Therefore, it was found necessary to provide such clutches with additional controllable damping means.

DESCRIPTION OF THE INVENTION

It is an object of the present invention to provide for a controllable damping of and in highly elastic shaft clutches and couplings, so that the damping properties of such clutches and couplings are supplemented, preferably to a variable degree. In accordance with the preferred embodiment of the present invention, it is suggested to connect a coil to the inner member, e.g., a rigid ring of the driven part of the clutch, and to provide an armature ring on the outer member, which may also be a rigid ring, so that an airgap is formed between coil and armature. The coil is energized by means of electric current which is controllable so that the oscillatory moments and torques as superimposed upon the regular torque transmission in the clutch are damped, whereby, however, this additional damping means does not participate in the regulant transmission of forces and torque through the clutch.

The clutch or coupling parts have a particular torsion angle relative to each other during operation. This angle depends on the load in the system. The oscillatory displacements are superimposed, but they are damped by the supplementing damping system which operates without interfering or modifying the elasitc stiffness of the elastic means in the clutch.

As the exciter current for the coil is selectible, even variable during operation, the damping forces are variable accordingly. This feature is of advantage, for example, in case of irregular ignition pressure in the engine and/or in the case of drop-out of one or several cylinders. Under such conditions, oscillations are positively introduced into the rotating system, and attenuation thereof and damping must be increased, possibly significantly, in order to run the engine without danger.

The exciter current for the damping coil can be automatically controlled in dependence upon the resonance peaks in the system. Thus, the current can be controlled in dependence upon engine speed, e.g., for increasing the damping if the speed approaches a resonance peak. Upon receding from the peak, damping control current is decreased. In the supercritical range, damping is undesirable because of energy consumption; thus, the control current can be made to match this condition also.

If the primary part of the clutch or coupling is connected regularly to the drive shaft, the device as described operates as a highly elastic but also as attenuating clutch or coupling. However, the secondary part acting normally as drive output of the clutch or coupling can be coupled to a drive shaft directly, leaving the part serving normally as input disconnected. The device operates as engine damping means under such conditions, particularly for damping crankshaft oscillations.

In accordance with another feature of the invention, cooling fins, ribs or vanes are provided on the outside of the armature ring. Additionally or in the alternative, the armature ring has its free end constructed as a cooling fan blowing, for example, air into an air gap for cooling both armature and coil. In either case, thermal energy is removed from the system; such heat develops strongly whenever the electromagnetic damping system consumes significant quantities of electrical energy.

It is another feature of the invention to provide a bore in the driven shaft as connected to the clutch, and to run the current supply to the coil through that bore. Alternatively, the coil can be provided with collector rings, and the energizing current is fed into the rotary system through brushes that slide on these rings. Still alternatively, current can be inductively transmitted to the coil. It was found advisable to use a low voltage, such as 12 to 24 volts, for driving the electrical system, so as to avoid any problem concerning insulation. Also, the clutch should be independent from the regular power supply, e.g., on board of a ship.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is an elevation, partially shown in longitudinal section of an elastic shaft clutch having an electromagnetic damping device in accordance with the preferred embodiment of the invention, and FIG. 2 shows an elastic shaft coupling with damping device, also in accordance with the preferred embodiment of the invention.

DESCRIPTION OF THE DRAWINGS

Proceeding now to the detailed description of the drawings.

Figure 1:
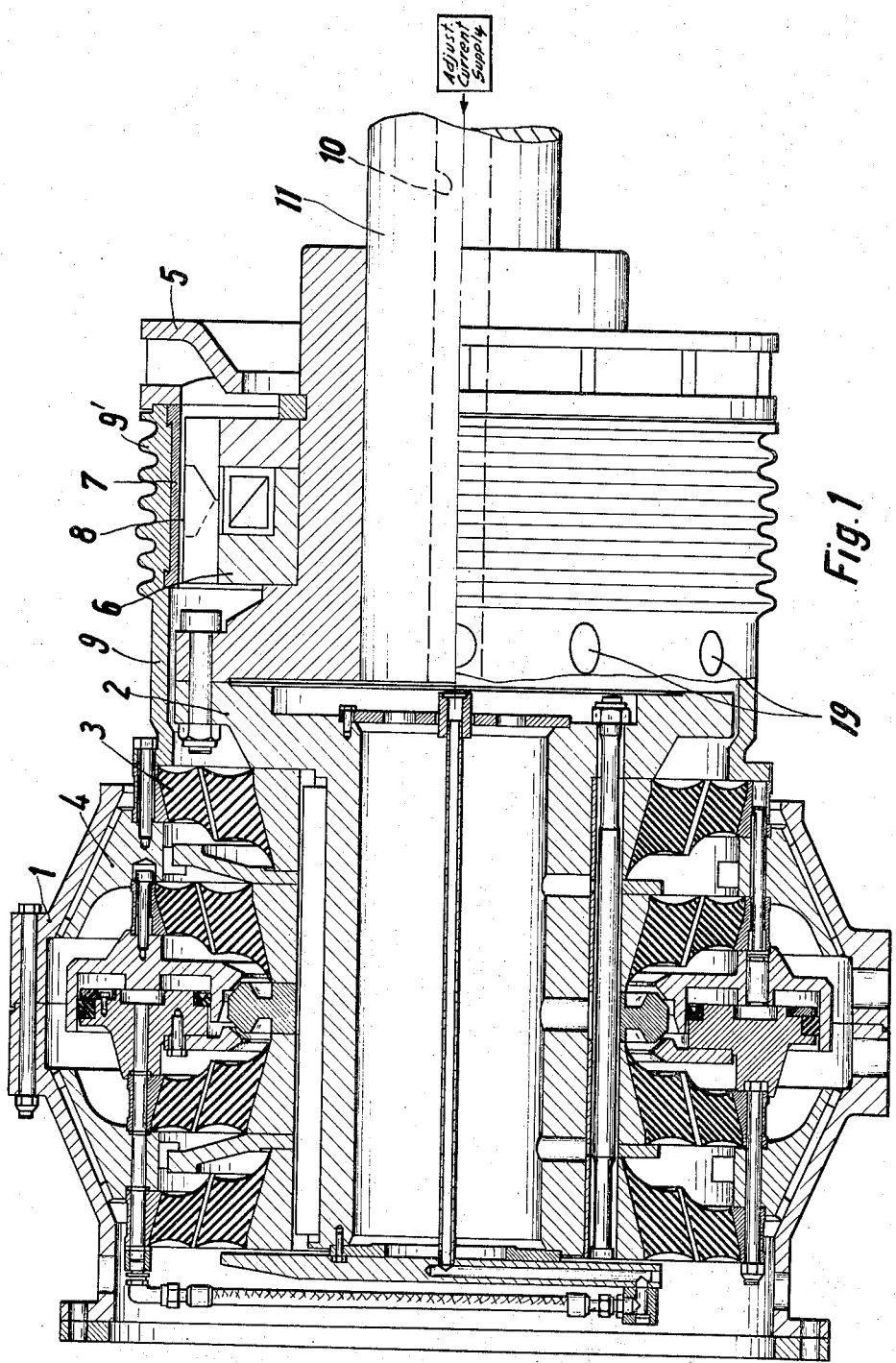
FIG. 1 illustrates a clutch with, normally, driving input, primary element 1 and a double cone friction clutch element 4 which is hydraulically operated and which serves as an outer ring element for the driven portion and secondary part of the clutch. The driven portion has also an inner ring element 2 bolted to the driven shaft 11 by means of flanges. The primary part, member 1, is likewise flanged to a driving part as shown along the left hand margin of the drawing. Outer and inner members 4 and 2 of the clutch are interconnected by several rubber elastic elements 3. The clutch is shown in FIG. 1 in the coupled state. If the clutch is controlled for disconnection, part 4 is decoupled from part 1.

A coil 6 is operatively connected to the inner ring 2. Actually, the coil is shown as being disposed on a driven shaft 11, and this flanged sleeve is bolted to ring 2, so that there is a true and permanent connection between coil 6 and clutch part 2. Coil 6 can be of single pole or unipolar construction. Shaft 11 is shown to have an axial bore 10, and a cable may traverse that bore to feed current to the coil. Alternatively, shaft 11 may be provided with collector rings, and brushes feed current to the rings. Still alternatively, coil 6 may be inductively coupled to an externally provided a.c.-field.

An armature ring 7 envelopes concentrically the coil 6, there being a cylindrical air gap 8 in between. Armature 7 is axially connected to clutch member 4 by means of a carrier sleeve 9. The sleeve is connected to, or is a part of, clutch member 4. Sleeve 9 is provided with annular cooling fins or ribs 9', and a ventilator 5 is connected to one end of sleeve 9, rotating therewith and being constructed for the purpose of ventilating the air gap. Air discharges through venting openings 19.

Normally, elements 4 and 2 and, therefore, parts 6 and 7 rotate in unison. However, oscillations undergone by one part and reacted into the elastic parts produce relative motion between armature ring 7 and coil 6. This relative motion results from torsional oscillations in the parts. Consequently, a voltage is induced in ring 7 which is dependent upon the current which is fed to coil 6. As a consequence, oscillations tend to be suppressed. This induced voltage depends upon frequency and amplitude of the relative motion between the clutch parts which rotate in speed synchronism in the average.

Two problems of an oscillating system as driven by a diesel engine are solved by the invention. First, the oscillations are displaced in the rotational, primary or driving system and reacted into the clutch, due to the fact that the elastic parts in the clutch have variable torsion spring stiffness. Second, the electromagnetic system permits selectible damping of the entire system. Thus, all advantages of an electric clutch such as displacement of the oscillations in any direction relative to the transmission of rotation are maintained for this particular clutch. Moreover, the physical separation of elastic components (parts 3) and additional damping (6,7) as far as construction is concerned, allows already existing clutches to be equipped additionally with the electromagnetic damping device.

Figure 2:
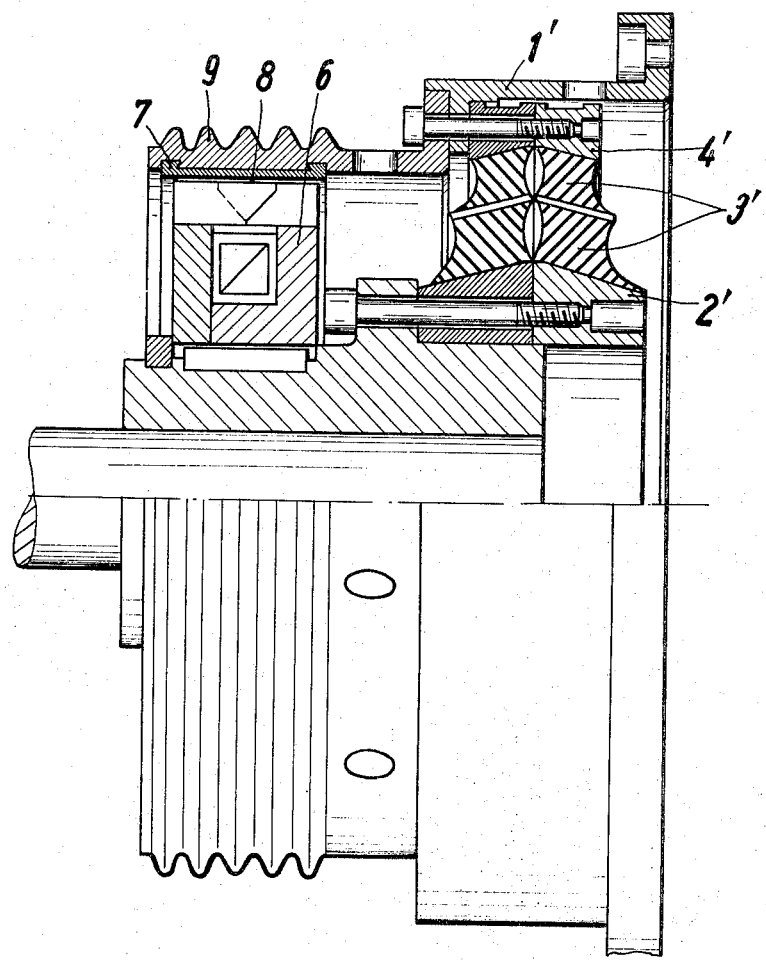

The embodiment shown in FIG. 2, shows a coupling with primary or driving sleeve 1' bolted to an outer ring member 4' of the clutch. An inner ring member 2' is secured to the driven shaft, and elastic members 3 are interposed between parts 4' and 2'. The electromagnetic coilarmature system is connected to these parts 2' and 4' as previously described, bridging the elastic members 3.

The system shown in FIG. 2 can be used for engine damping, whereby in dependence upon the spring stiffness of the elastic members, the electromagnetic system acts only for damping, or provides for damping and oscillation displacing oscillations from critical parts. As the current is adjustable, the damping can be matched to the resilient characteristic of the coupling.

The device in FIG. 2 can be used as a damping device by simply connecting it to one free end of a rotating shaft, such as an intermediate shaft, i.e., transmission gear.

In all these cases, rotational oscillations of a system can be accurately calculated and, therefore, predetermined and considered in the design. The rotational and torsional stiffness (due to the elastic component) is proportional to angular displacement, and the electromagnetic damping is proportional to the relative speed between the parts. The dependency of the system on frequency becomes readily a parameter that can be considered directly in the calcualtions as the speed proportionality of the electromagnetic damping includes dependency on frequency.

The invention is not limited to the embodiments described above but all changes and modifications thereof not constituting departures from the spirit and scope of the invention are intended to be included.

We claim:

1. In an elastic shaft coupling or clutch for interconnecting a driving input and a driven output having a rigid outer ring, a rigid inner ring and elastic members interposed between inner and outer rings, the improvement comprising a coil connected to one of the rings for rotation therewith and following any rotational oscillations of the one ring; an armature connected to the other one of the rings and following any rotational oscillations of the other ring, and disposed relative to the coil in concentric relation thereto, there being an air gap between the coil and the armature, so that coil and armature are independently rotatable to each other and follow individually the rotation of driving input and driven outputs whenever the clutch or coupling is engaged; and means to feed electric current to the coil.

2. In an elastic coupling or clutch as in claim 1, the armature being provided with cooling fins or ribs.

3. In an elastic coupling or clutch as in claim 1, the armature being provided with a fan for blowing cooling air into the air gap.

4. In an elastic shaft coupling or clutch as in claim 1, wherein the outer ring is connected or connectable to the drive input of the coupling or clutch, and the inner ring is connected to the drive output of the coupling or clutch.

5. In a clutch or coupling as in claim 1, wherein the normally drive output of the clutch or coupling is connected to a drive shaft, the normally drive input of the clutch or coupling being free.

* * * * *